United States Patent
Higgins

(10) Patent No.: US 9,174,658 B2
(45) Date of Patent: Nov. 3, 2015

(54) COLLAPSIBLE WHEELBARROW

(71) Applicant: Patrick Higgins, Claygate (GB)

(72) Inventor: Patrick Higgins, Claygate (GB)

(*) Notice: Subject to any disclaimer, the term of this patent is extended or adjusted under 35 U.S.C. 154(b) by 0 days.

(21) Appl. No.: 14/456,881

(22) Filed: Aug. 11, 2014

(65) Prior Publication Data

US 2015/0042055 A1    Feb. 12, 2015

(30) Foreign Application Priority Data

Aug. 9, 2013    (GB) .................................... 1314342.5

(51) Int. Cl.
  *B62B 1/20*    (2006.01)
  *B62B 5/06*    (2006.01)

(52) U.S. Cl.
  CPC ...... *B62B 1/208* (2013.01); *B62B 5/066* (2013.01)

(58) Field of Classification Search
  CPC ............ B62B 1/18; B62B 1/20; B62B 1/208; B62B 3/02; B62B 3/022; B62B 3/025
  USPC ............. 280/19, 20, 639, 651, 652, 653, 654, 280/655, 656, 659, 30
  See application file for complete search history.

(56) References Cited

U.S. PATENT DOCUMENTS

| | | | | |
|---|---|---|---|---|
| 2,992,011 A * | 7/1961 | Becan | ........................... | 280/654 |
| 3,394,946 A * | 7/1968 | Anderson | ..................... | 280/654 |
| 5,211,434 A * | 5/1993 | Lanava | .............................. | 220/7 |
| 5,374,095 A * | 12/1994 | Ramseth | ......................... | 296/32 |
| 5,769,449 A * | 6/1998 | Keesee | ........................... | 280/656 |
| 6,217,043 B1 * | 4/2001 | Chumley | ......................... | 280/40 |
| 6,902,184 B2 * | 6/2005 | Hsu | .................................. | 280/653 |
| 7,052,033 B2 * | 5/2006 | McDonell | ..................... | 280/656 |
| 2011/0291371 A1 * | 12/2011 | Harris | ......................... | 280/47.31 |

* cited by examiner

*Primary Examiner* — John Walters
(74) *Attorney, Agent, or Firm* — Invention To Patent Services; Alex Hobson

(57) ABSTRACT

A collapsible wheelbarrow has a barrow formed of a plurality of panels that are hinged together to transition between an erected state in which the panels are configured to define the operative barrow and a collapsed state in which most or all of the panels are not folded together and the barrow is relatively flattened out extending over a greater ground area than when in the erected state so that the barrow in the collapsed, flattened state can function as a ground sheet, having an enlarged surface area. For a gardener this makes it much better for collecting leaves, grass or other garden cuttings or materials, which may be swept or raked directly onto the flattened but floor area-expanded barrow before then raising/erecting the barrow to its operative wheelbarrow state to be wheeled off to a compost heap or other location.

23 Claims, 6 Drawing Sheets

COLLAPSIBLE WHEELBARROW

CROSS REFERENCE TO RELATED APPLICATIONS

This application is claims the benefit and priority to UK patent application GB1314342.5 filed on 9 Aug. 2013 entitled Collapsible Wheelbarrow and currently pending; the entirety of which is incorporated herein by reference.

BACKGROUND OF THE INVENTION

1. Field of the Invention

The present invention concerns improvements in and relating to collapsible wheelbarrows, being wheelbarrows that are configured to be collapsible to a flattened or flat pack state. It is primarily, but not exclusively, for use in gardening.

2. Background

Collapsible wheelbarrows have a long history, dating back over a century or more. For example in 1898 a collapsible wheelbarrow was patented as GB 20,492 and having a barrow or bucket comprising an assembly of rigid panels that are hinged to fold together to lie alongside each other when collapsed and to unfold to form the erected operative wheelbarrow. In more recent collapsible wheelbarrow designs, such as in GB 2,421,481 and GB 2,366,256 the barrow or bucket is made of canvas or other flexible material slung on a wheeled articulated skeletal frame that is adapted to fold at one or more joints so that canvas can fold and the frame elements can stack/nest alongside each other when collapsed. In all cases the frame is configured to transition between the erected operative state and a collapsed flat, compact state where the walls and floor of the bucket/barrow are folded together for storage, thereby occupying minimal storage and floor space. The existing collapsible wheelbarrow designs are all designed to meet the requirement for occupying minimal floor space when collapsed and do so well but are all essentially uni-functional, performing as wheelbarrows when erected but being inoperative in the flattened state.

It is an object of the present invention to provide a wheelbarrow that has additional enhanced functionality in the collapsed state so that it can be used to facilitate handling of materials by the wheelbarrow. A further object is to provide a wheelbarrow that can assist gardeners with gathering and transporting garden waste. Whereas the likes of WO 2012167317 have previously proposed novelty dual functional collapsible wheelbarrows to convert from being a wheelbarrow to a deckchair these do not assist in the basic function of the wheelbarrow and both functions relate to the erected state of the barrow not the collapsed state of the barrow.

SUMMARY OF THE INVENTION

According to a first aspect of the present invention there is provided a collapsible wheelbarrow that comprises a barrow (the open-topped carrying part of the wheel-barrow, otherwise commonly referred to as the 'bucket') formed of a plurality of panels that are arranged to transition between an erected state in which the panels are configured to define the operative barrow and a collapsed state in which most or all of the panels are not folded together and the barrow is relatively flattened out extending over a greater ground area than when in the erected state. Preferably adjacent panels are hinged together for folding relative to one another.

The barrow in the collapsed, flattened state can function as a ground sheet, having an enlarged surface area and for a gardener this makes it better for collecting leaves, grass or other garden cuttings or materials that may be swept or raked directly onto the flattened barrow. The wheelbarrow may then be erected by raising those panels that define the side walls and end walls of the barrow with the collected materials still held in the barrow surrounded by the rising walls to enable the collected materials to then be transported in the wheelbarrow to a destination such as a compost heap or other location for storage, recycling or disposal.

The panels of the barrow suitably define a floor, two sidewalls and a rear end wall of the wheelbarrow. The floor is preferably flat in the erected state.

In one preferred embodiment, at least two of the panels of the wheelbarrow are configured to be folded together/towards each other in the erected state. Suitably, these are two pairs of adjoining panels that flank the rear end wall, one to the right hand side and the other to the left hand side of the rear end wall. The lapped panels may or may not be fully folded together but nevertheless be folded close to each other in a V configuration and can thereby serve to enhance the rigidity and the stability of the erected wheelbarrow, reinforcing the core of the wheelbarrow while retaining extended holding capacity at the rear of the barrow.

The wheelbarrow necessarily has at least one wheel. Preferably, the wheelbarrow has a pair of wheels, each wheel being provided as a respective one of a pair of wheeled legs. Preferably, each wheeled leg is located at a respective fold line between an adjoining panel pair. Most preferably in the case where the barrow has two pairs of adjoining panels that flank the rear end wall the fold line of each pair has a respective leg. Each leg suitably is adjacent the respective fold line and extending parallel to it.

Preferably, the barrow's panels are moulded of plastics. Suitably each panel is substantially rigid and preferably each is substantially planar/flat.

The barrow may be an assembly of discrete panels, wherein adjoining panels are joined together by linkages that serve as hinges. Conversely the barrow may be a unitary structure where the panels are portions of a sheet that has living hinges, or fold lines or lines of weakening, between adjoining panels so that the adjoining panels may be folded together and apart.

The barrow may comprise an articulated framework of panel frames with individual panels of canvas or other fabric stretched over panel frames.

The one or more wheels of the wheelbarrow are suitably articulated to the barrow so as to collapse to lie substantially co-planar or plane parallel with the flattened panels in the collapsed state of the wheelbarrow. An aperture may be formed in or through a panel to accommodate a wheel so that the at least one wheel is able to lie nested into the flattened barrow.

A locking assembly is suitably provided on the wheelbarrow for securing it in the erected state. In preferred embodiments the locking assembly is in or on a bar or other rigid bridging link that spans between sidewalls of the wheelbarrow. The bridging link may be formed as a handle bar that extends between the wheeled legs or upward extensions of the wheeled legs of the wheelbarrow. Preferably the handle bar has a left hand portion extending from the left leg and a right hand portion extending from the right leg and that are adapted to couple together. The locking assembly may suitably comprise a groove or slot in or on one of said portions into which a locking projection in or on the other of said portions is movable. The locking assembly suitably operates by rotation and the groove or slot may suitably have a dog-leg form. In other variants the locking assembly may comprise mating screw threads or other latching or coupling arrangements for holding the sidewalls of the wheelbarrow erect in fixed relation/spacing apart.

The panels of the barrow are suitably hinged together whereby in the collapsed state the panels are substantially contiguous and form a substantially continuous sheet over the ground. The collapsed barrow is thus like a ground sheet and the panels make the sheet appear tessellated in plan view. The panels suitably remain hinged together both in the erected state and in the collapsed state, enabling the transition between one state and the other to be effected with ease.

In accordance with a second aspect of the present invention, there is provided a method of operating a wheelbarrow for collecting and transporting ground-lying materials the method comprising the steps of:

i) providing a collapsed wheelbarrow that comprises a wheeled barrow formed of a plurality of panels to transition between an erected state in which the panels are configured to define the operative barrow and a collapsed state in which most or all of the panels are not folded together and the barrow is relatively flattened out extending over a greater ground area than when in the erected state;

ii) deploying the wheelbarrow in the collapsed state on the ground along-side ground-lying materials and sweeping, raking or otherwise transferring the ground-lying materials onto the barrow; and iii) erecting the wheelbarrow to the erected operative wheelbarrow state, standing on the at least one wheel of the wheelbarrow to be wheeled to another location.

Preferably the wheelbarrow has two wheeled legs and the step of erecting the wheelbarrow is effected by moving the legs from being splayed apart to being closer together and substantially mutually parallel.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Preferred embodiments of the present invention will now be further described, by way of example only, with reference to the accompanying drawing, in which.

DETAILED DESCRIPTION OF THE ILLUSTRATED EMBODIMENTS

Figure 1:
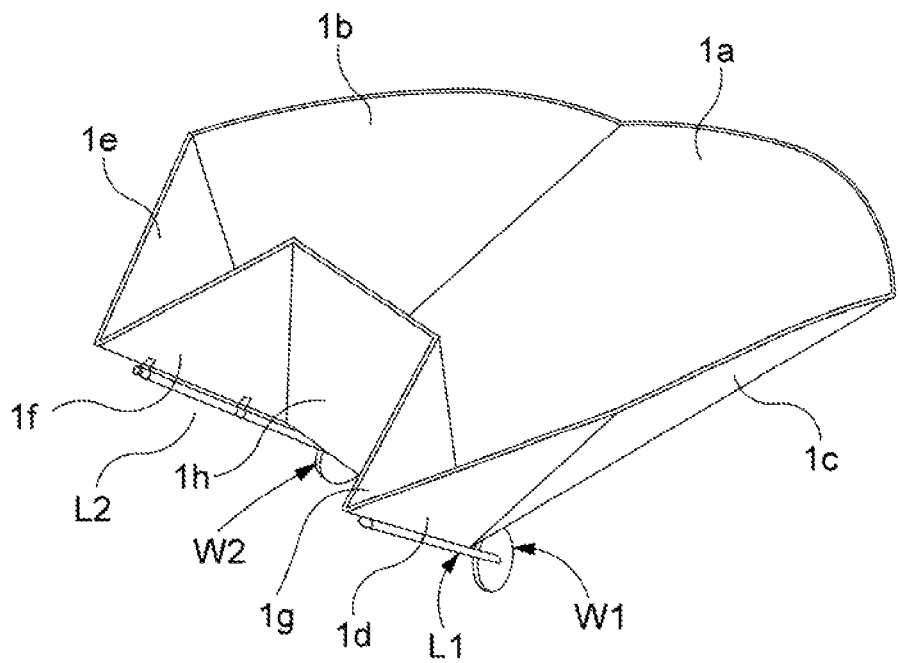
FIG. 1 is a rear perspective view from above right hand side of the first preferred embodiment of collapsible wheelbarrow as erected but with handle bars omitted.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 2:
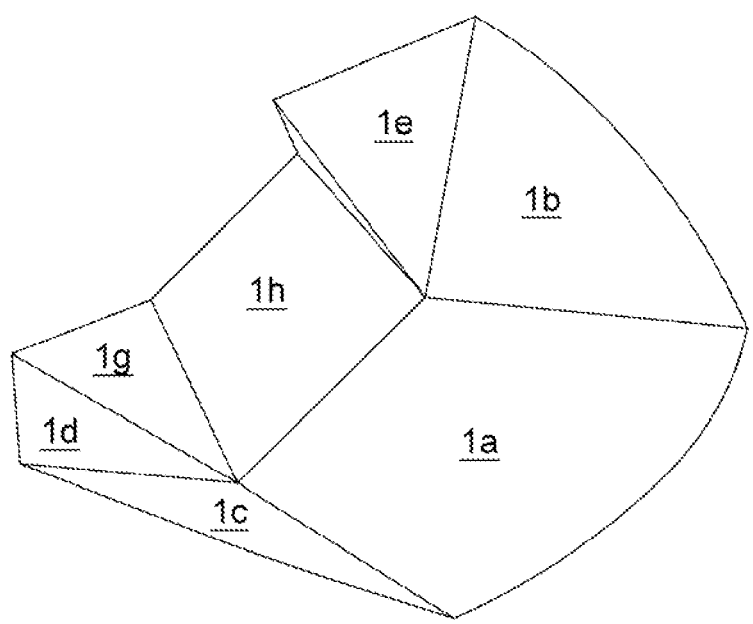
FIG. 2 is a rear perspective view from below right hand side of the FIG. 1 wheelbarrow, but with wheeled legs omitted.

Referring to FIGS. 1 and 2, the barrow of the illustrated collapsible wheelbarrow is an assembly of eight panels 1a-1h that are rigid flat/planar plastic mouldings. Adjoining panels are linked edge to edge by hinge linkages/bindings that allow the panels to articulate so that the panels may fold about a fold line between the adjoining edges.

A first one of the panels 1a is trapezoidal in shape and serves to define the floor of the barrow, which broadens from rear to front of the barrow. This floor panel 1a is flanked to the left and right hand sides by panels 1b, 1c that are triangular in shape and which define the right and left side well respectively of the barrow. At the rear end of the barrow a rectangular panel 1h defines the rear end wall 1h, which is hinged to the rear edge of floor panel 1a and which in the erected state of the barrow is substantially upright and orthogonal to the floor 1a.

The rear end wall panel 1h is flanked to the right and left sides by a pair of small triangular panels 1f, 1g that join to the end wall panel edges at one end and to a further pair of triangular panels 1d, 1e at the other end and which are in turn joined to the sidewalls 1b, 1c respectively. Each of the adjoining pairs of small triangular panels 1d, 1g and 1e, 1f are configured to have the panels in the pair folded together/towards each other in the erected state forming a V configuration as viewed from above. They serve to enhance the rigidity and the stability of the erected wheelbarrow, reinforcing the core of the wheelbarrow while at the same time giving extended holding capacity at the rear of the barrow, extending rearwardly behind the rear end wall 1h.

Also visible in FIG. 1 are the lower halves of a pair of wheeled legs L1, L2 that are fitted to the barrow. Each leg L1, L2 has a respective wheel W1, W2 at is lowermost end and each is attached to a respective one of the rear wall inner extension panels 1f, 1g close to the rearmost fold line and parallel to it. Each of the legs L1, L2 is fixed to a respective one of the rear wall inner extension panels 1f, 1g such that moving the legs relative to each other can erect or collapse the wheelbarrow.

Figure 3:
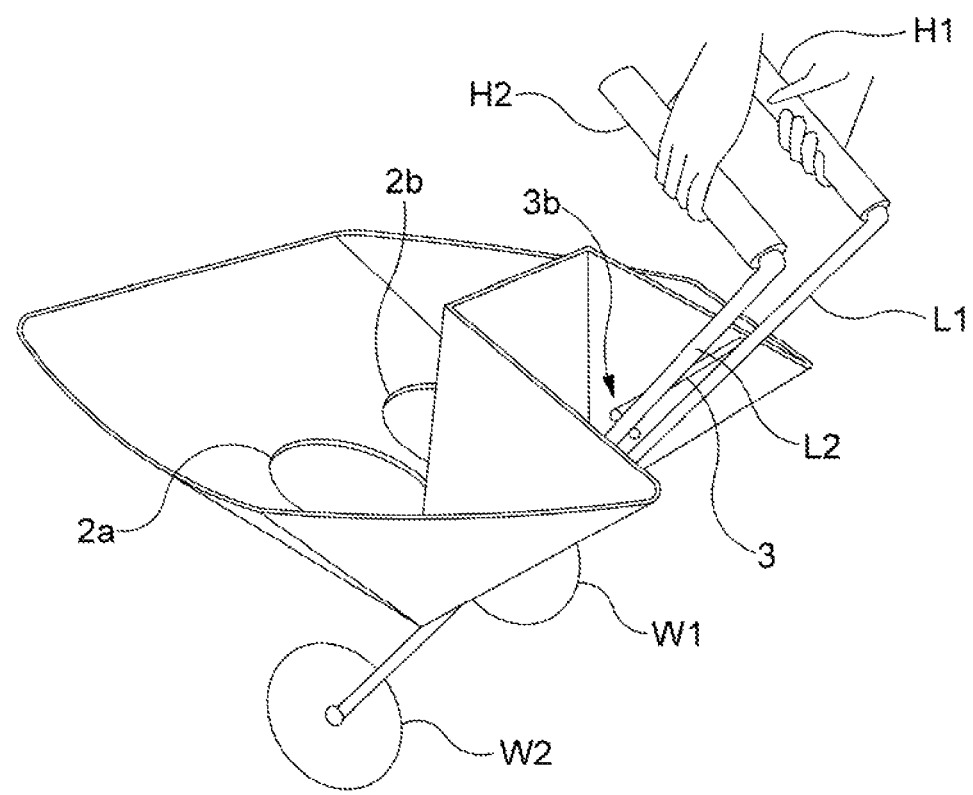
FIG. 3 is a rear perspective view from below left hand side of a variant of the FIG. 1 wheelbarrow showing the wheeled legs and further having apertures in the floor of the barrow for inboard stowing of the wheels.
Figure 4:
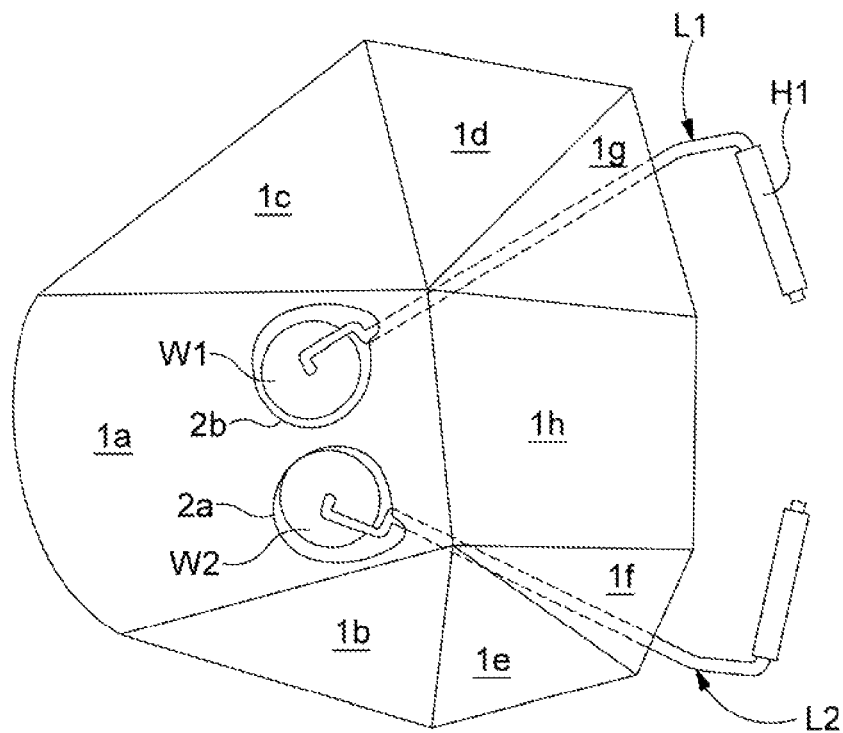
FIG. 4 is a plan view from below of the FIG. 3 wheelbarrow as collapsed to a flattened state and showing the wheels stowed in the apertures of the floor of the barrow.
Figure 5:
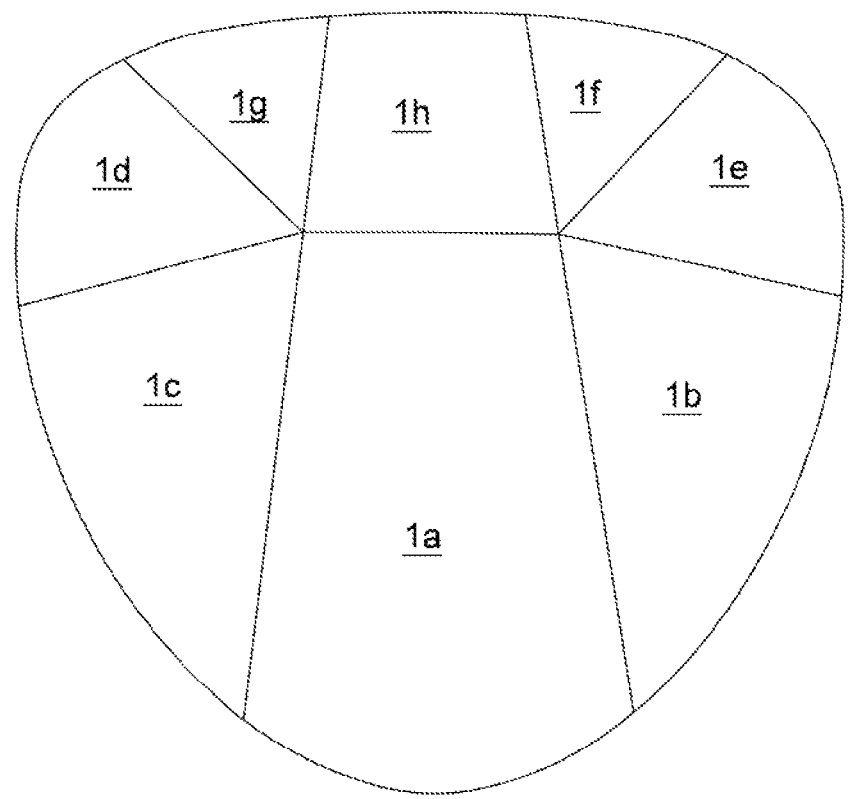
FIG. 5 is a plan view of a variant of the barrow as collapsed to a flattened state, this variant lacking apertures and having a more rounded overall perimeter shape to further increase spread area for collecting garden waste or other materials.

By moving the legs L1, L2 from the upright 'close' mutually parallel state in FIGS. 1 and 3) to a relatively horizontal splayed state (as in FIG. 4), this causes the linked panels 1a-1h to also tilt about their fold lines to flatten to move from the erected wheelbarrow state to the relatively horizontal collapsed flat ground sheet-like state shown in FIGS. 4 and 5. The twisting and separating or bringing together moving of the legs L1, L2 to control erection or collapse of the wheelbarrow is aided by handle bar portions H1. H2 at the upper ends of the legs L1, L2. In the FIGS. 4, 5 embodiment to erect the wheelbarrow from the collapsed flat ground sheet-like state the user simply picks the handle bars H1, H2 up from the ground and twists/rotates them to point forward at the same time. This movement raises the wheels upright so that the structure stands on the wheels with the wheels pointing forwards and at the same time it causes the sidewalls and rear wall of the wheelbarrow to fold upwards into the erected operative wheelbarrow state.

In the flattened state, the sheet area of the barrow is at its greatest, being defined by a length of, for example, 920 mm from front end apex to rear end and by a width at the broadest point of the order of 1070 mm. This and the ground hugging profile of the flattened collapsed wheelbarrow allow a substantial mass of leaves, grass, weeds or other plant material to be swept or raked onto the flat barrow and held before erecting the wheelbarrow to transport the collected material away. By contrast, when erected with the side walls tilted up at an angle from the floor 1a and the rear end wall 1h raised substantially to the vertical plane, the rear end wall 1h is closer to the front of the wheelbarrow and the sidewalls 1b, 1c are closer to each other making the overall footprint of the barrow smaller but holding the material in and enabling the barrow containing the material to be easily transported on the wheels wherever required. The floor panel 1a of the barrow is as illustrated narrower at the rear wall end 1h and broadens out towards the front end of the barrow. In one example the floor panel has a width of the order of 260 mm and the floor widens to be approximately double the width, ie of the order of 500 mm, at the front end.

As shown in FIGS. 3 and 4, the floor panel 1a of the barrow may be modified to have a pair of large cut-out apertures 2a, 2b shaped to accommodate the wheels W1 and W2 of the legs L1, L2 when the wheelbarrow is in the collapsed state flat against the ground and the wheels twisted horizontal and also flat against the ground. This can bring the flattened wheelbarrow even closer against the ground, avoiding any stand-off from the ground that may otherwise be caused by the thickness of the wheels W1, W2 and thereby enhancing ease of treating the collapsed wheelbarrow as a ground sheet/tarpaulin onto which leaves and other debris may be raked or swept.

FIG. 5 shows a plan view of collapsed barrow where the outer perimeter of each panel 1a-h is curved in a convex manner, thereby increasing the overall footprint/ground coverage area of the collapsed wheelbarrow relative to an equivalent barrow that is more polygonal in form, having straight outer perimeter edges.

In the FIGS. 3 and 4 embodiment the wheelbarrow is secured in the erected state by a strut 3 that spans across the wheelbarrow, bridging between the wall panels 1f, 1g that hold the sidewalls in position. The strut 3 is pivotally attached to the right hand leg L1 and is releasably locked to the left hand leg L2 by a locking assembly comprising a nut and bolt 3b.

Figure 6:
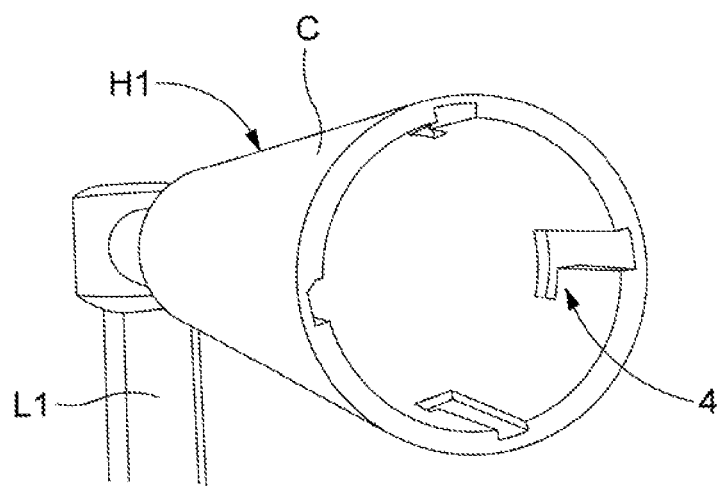
FIG. 6 is a perspective end view of a handlebar portion on one leg of the wheelbarrow that has a set of dog-leg slots to co-operatively engage with a corresponding pin on a handlebar portion on the other leg of the wheelbarrow.
Figure 7:
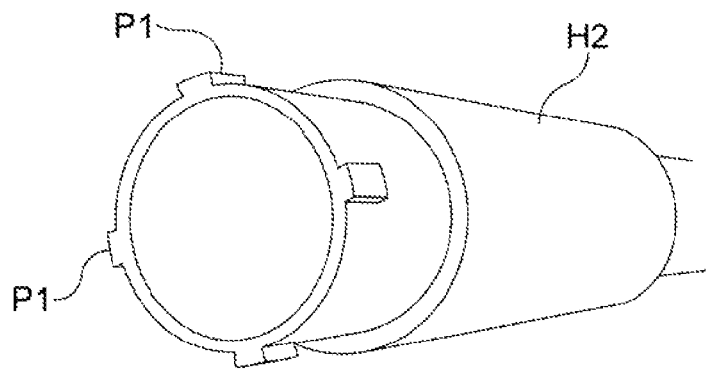
FIG. 7 is a perspective end view of the handlebar portion on the other leg of the wheelbarrow that has corresponding pins to co-operate with the dog-leg slots.
Figure 8:
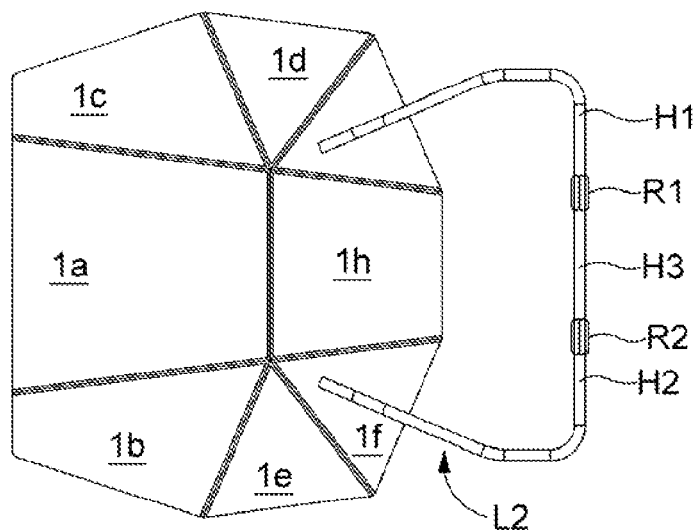
FIG. 8 is a plan view from above of a third embodiment of wheelbarrow as collapsed to a flattened state and showing the legs and associated left and right handle bar portions of the wheelbarrow as being con-joined by an intermediate member (to which they are articulated to allow the legs to be swung together for erecting).
Figure 9:
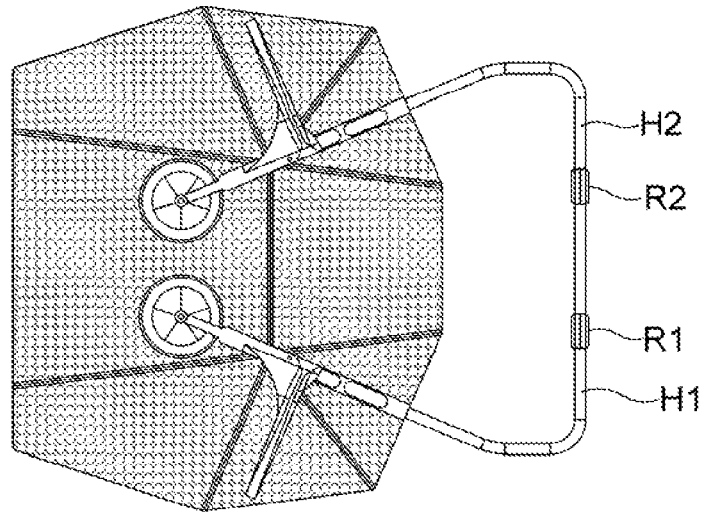
FIG. 9 is a plan view from below of the third embodiment.
Figure 10:
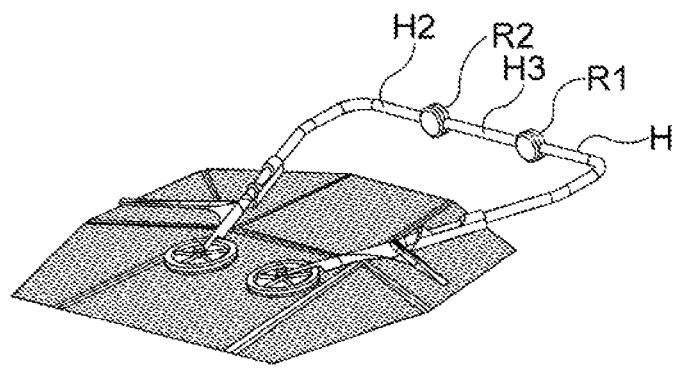
FIG. 10 is a perspective view from below of the third embodiment.
Figure 11:
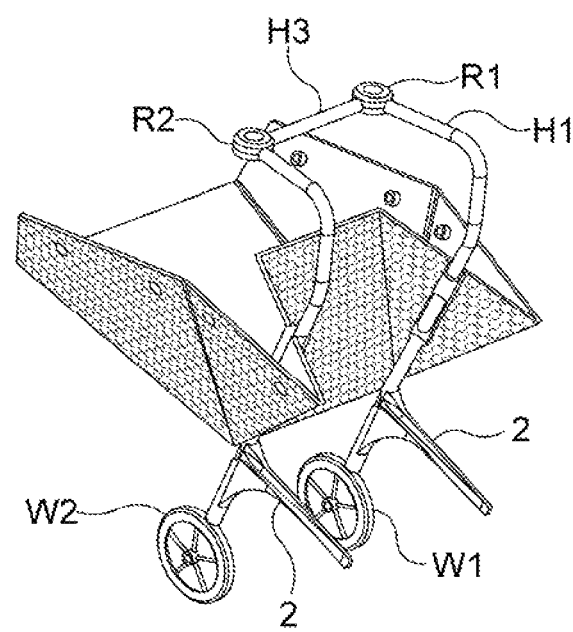
FIG. 11 is a perspective view from above of the third embodiment in erected state.

As a variant/improvement to the locking assembly, FIG. 6 shows a detailed view of the right hand portion H1 of a modified version of handlebar that is designed to span across the wheelbarrow, bridging between the wall panels 1f, 1g that hold the sidewalls in position so that the handlebar can serve to lock the wheelbarrow in the erected state. Here the handlebar replaces the strut 3 and the locking assembly is formed by a rotatable collar C that is captive on the right hand portion H1 of handlebar and which has a dogleg groove 4 in its bore at the free end where it can couple to the free end of the left hand portion H2 of handlebar. The left hand portion H2 (see FIG. 7) of handlebar is correspondingly formed so that its free end will insert into the collar C as a male-female fit and a set of pins P1 projecting radially at the free end of the left hand portion H2 will engage in the doglegs 4 when the collar C is rotated on the handle bar.

Turning now to FIGS. 8 to 14, these show a further embodiment of the invention which differs from the preceding embodiment most significantly in that the right and left handle portions H1 and H2 are conjoined. They are linked to each other by an intermediate handle bar tube length H3 that has at each end a respective button-released ratchet pivot R1, R2 so that the right hand leg L1 and associated handle bar portion H1 can articulate relative to the left hand leg L2 and associated handle bar portion H2 allowing the wheelbarrow to be erected or collapsed again. This conjoined articulated arrangement of the handlebar H1-3 may facilitate the erecting and collapsing process and enhances stability and security of the wheelbarrow in its respective collapsed and erected states and as it transitions between them.

Each leg L1, L2 of the wheelbarrow is further modified to have a respective prop 2 extending substantially orthogonally therefrom to support the erected wheelbarrow propped up while standing on its wheels W1, W2 at rest. This modification can be used with any of the embodiments. Unlike conventional wheelbarrow support props, the props 2 are on the rotating legs L1, L2 and do not impede collapsing or erection.

Figure 12:
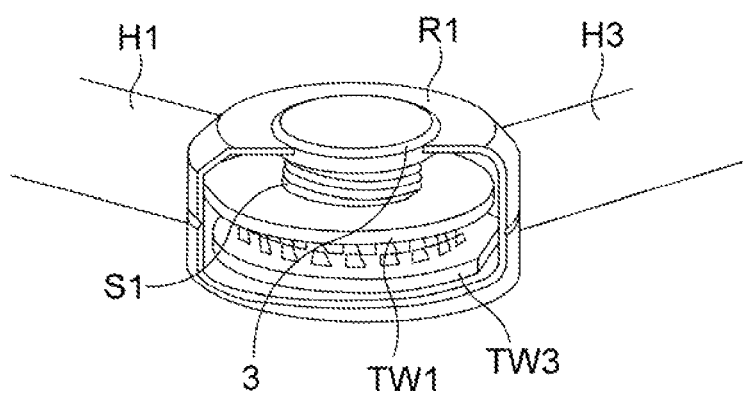
FIG. 12 is a detail view of a button-release ratchet pivot of the third embodiment.

FIG. 12 shows in detail the button-released ratchet pivot R1 at the right side of the wheelbarrow. The button-released ratchet pivot R2 at the left side of the wheelbarrow is substantially the same (mutatis mutandis). In the FIG. 12 the pivot's casing is part cut-away to show the circular push-button 3 resiliently biased outwardly by a spring S1 away from a toothed wheel TW1 on the end of the right hand handlebar portion H1. The circular push-button 3 has a central stem that passes through the toothed wheel toothed wheel TW1 on the end of the right hand handlebar portion and pulls against at its far end a toothed wheel TW3 on the end of the intermediate handlebar length H3. In this state the teeth of the toothed wheel TW1 and the toothed wheel TW3 mesh and lock against rotation so that the right hand handlebar portion H1 cannot be swiveled relative to the intermediate handlebar length H3 and thus locking it to hold the erected or the collapsed state of the wheelbarrow. The toothed wheels TW1, TW3 are shown as each having a plurality of teeth but could for cost economy be simplified to for example just have a single peg on one to engage in one of two 90 degree radially spaced apart sockets on the other that correspond to the erected and the collapsed state respectively.

Figure 13:
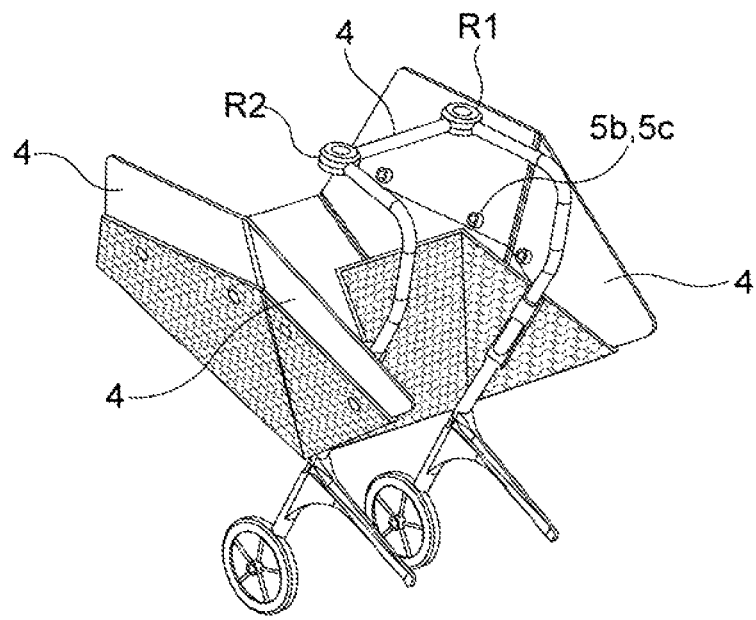
FIG. 13 is a perspective view from above of the third embodiment with an added set of upper sidewall extension panels fastened to the wheel-barrow sidewalls to increase its holding capacity.
Figure 14:
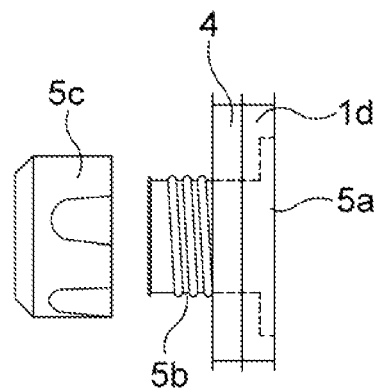
FIG. 14 is a detail view of a threaded fastener for securing the upper sidewall extension panels to the wheel-barrow.

Turning to FIGS. 13 and 14, these show use of sidewall extension panels 4 to increase the capacity of the wheelbarrow substantially. The sidewall extension panels 4 are shown as smooth-sided while the original sidewall panels and other panels 1a-1h of the wheelbarrow are shown as patterned with a cellular ribbing for strengthening. The sidewall extension panels 4 are assembled to and secured to the sidewalls by use of a nut and bolt fastener arrangement. A specially moulded set of fasteners 5 may be used such as is illustrated in FIG. 14. The fastener 5 illustrated in FIG. 14 comprises a small plastic panel/base part 5a with a screw threaded column 5b projecting from it, the base part here 5a being welded into a sidewall panel 1d of the wheelbarrow while the column 5b projects inwardly through an aperture in the sidewall panel 1d and through a corresponding aperture in extension panel 4. The fastener is completed by a moulded nut/threaded cap 5c that is screw threadedly engaged with the thread on the threaded column 4b.

The manufacture of the wheelbarrow can be relatively stream-lined and efficient/economical. The wheelbarrow can be made of a plurality of separate panels that are coupled by hinge linkages. Since the wheelbarrow has axial symmetry, the eight panel configuration of wheelbarrow illustrated in the drawings may be assembled from stocks of only five differently shaped panels.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A collapsible wheelbarrow that comprises a barrow formed of a plurality of panels that are hinged together to transition between an erected state in which the panels are configured to define an operative barrow and a collapsed state in which most or all of the panels are not folded together and the barrow is relatively flattened out extending over a greater ground area than when in the erected state, wherein the wheelbarrow has a pair of wheels that lie substantially co-planar or plane parallel with the flattened panels in the collapsed state of the wheelbarrow whereby the wheelbarrow is erected by raising and turning the wheels from being substantially co-planar or plane parallel with the flattened panels to being substantially mutually parallel with each other.

2. A collapsible wheelbarrow as claimed in claim 1, wherein panels of the bar each define respectively a floor, two sidewalls and a rear end wall of the wheelbarrow.

3. A collapsible wheelbarrow as claimed in claim 1, wherein at least two of the panels of the wheelbarrow are configured to be folded together or towards each other in the erected state.

4. A collapsible wheelbarrow as claimed in claim 3, wherein the at least two panels are two pairs of adjoining panels that flank the rear end wall, one pair to the right hand side and the other to the left hand side of the rear end wall.

5. A collapsible wheelbarrow as claimed in claim 4, wherein the lapped panels in the erected state are folded close to each other in a V configuration as viewed from above.

6. A collapsible wheelbarrow as claimed in claim 1, each wheel being provided as a respective one of a pair of wheeled legs.

7. A collapsible wheelbarrow as claimed in claim 6, wherein each wheeled leg is located at or near a respective fold line between an adjoining panel pair.

8. A collapsible wheelbarrow as claimed in claim 6 wherein the wheelbarrow has a respective supporting prop on and projecting from each leg to engage the ground and support the wheelbarrow when it is standing upon the wheels.

9. A collapsible wheelbarrow as claimed in claim 1 wherein the barrow's panels are moulded of plastics.

10. A collapsible wheelbarrow as claimed in claim 1 wherein the barrow is an assembly of discrete panels, wherein adjoining panels are joined together by linkages that serve as hinges.

11. A collapsible wheelbarrow as claimed in claim 1 wherein the barrow is a unitary structure where the panels are portions of a sheet that has living hinges, or fold lines or lines of weakening, between adjoining panels so that the adjoining panels may be folded together and apart.

12. A collapsible wheelbarrow as claimed in claim 1 wherein the barrow comprise an articulated framework of panel frames with individual panels of canvas or other fabric stretched over panel frames.

13. A collapsible wheelbarrow as claimed in claim 1, wherein an aperture is formed in or through a panel to accommodate a wheel so that the wheel is able to lie nested into the flattened barrow.

14. A collapsible wheelbarrow as claimed in claim 1 wherein a locking assembly is provided on the wheelbarrow for securing it in the erected state.

15. A collapsible wheelbarrow as claimed in claim 14, wherein the locking assembly is in or on a bar or other rigid bridging link that spans between sidewalls of the wheelbarrow or members that are linked to the sidewalls of the barrow to hold the sidewalls at a fixed spacing apart.

16. A collapsible wheelbarrow as claimed in claim 15, wherein the bridging link is formed as a handle bar that extends between the wheeled legs or upward extensions of the wheeled legs of the wheelbarrow.

17. A collapsible wheelbarrow as claimed in claim 16, wherein the handle bar has a left hand portion extending from the left leg and a right hand portion extending from the right leg and that are coupled together.

18. A collapsible wheelbarrow as claimed in claim 17, wherein the locking assembly comprises at least one ratchet pivot.

19. A collapsible wheelbarrow as claimed in claim 18, wherein the handle bar left hand portion and right hand portion are coupled together by an intermediate handlebar portion and with a first ratchet pivot between the handle bar left hand portion and the intermediate handlebar portion and a second ratchet pivot between the handle bar right hand portion and the intermediate handlebar portion.

20. A collapsible wheelbarrow as claimed in claim 1 wherein the barrow in the flattened state has a rounded shape with the outer perimeter of the panels curving outwardly, extending the footprint of the barrow in the flattened state.

21. A collapsible wheelbarrow as claimed in claim 1 wherein the panels of the barrow are hinged together whereby in the collapsed state the panels are substantially contiguous and form a sheet over the ground.

22. A collapsible wheelbarrow as claimed in claim 1 wherein the panels of the barrow are augmented by sidewall extension panels that demountably fasten to side wall panels of the wheelbarrow.

23. A method of operating a wheelbarrow for collecting and transporting ground-lying materials the method comprising the steps of:
   i) providing a collapsed wheelbarrow that comprises a wheeled barrow formed of a plurality of panels to transition between an erected state in which the panels are configured to define the operative barrow and a collapsed state in which most or all of the panels are not folded together and the barrow is relatively flattened out extending over a greater ground area than when in the erected state;
   ii) deploying the wheelbarrow in the collapsed state on the ground along-side ground-lying materials and sweeping, raking or otherwise transferring the ground-lying materials onto the barrow; and
   iii) erecting the wheelbarrow to the erected operative wheelbarrow state, standing on a pair of wheels of the wheelbarrow to be wheeled to another location, wherein the pair of wheels lie substantially co-planar or plane parallel with the flattened panels in the collapsed state of the wheelbarrow and the step of erecting the wheelbarrow is effected by raising and turning the wheels from being substantially co-planar or plane parallel with the flattened panels to being substantially mutually parallel with each other.

\* \* \* \* \*